N. D. FLY.
ANT TRAP.
APPLICATION FILED JULY 1, 1908.

918,523.

Patented Apr. 20, 1909.
2 SHEETS—SHEET 1.

Witnesses
F. L. Ourand
R. R. Duffie

Inventor
Nathaniel D. Fly
By John S. Duffie
Attorney

N. D. FLY.
ANT TRAP.
APPLICATION FILED JULY 1, 1908.

918,523.

Patented Apr. 20, 1909.
2 SHEETS—SHEET 2.

Witnesses
F. L. Ourand
R. R. Duffie

Inventor
Nathaniel D. Fly
By John S. Duffie
Attorney

UNITED STATES PATENT OFFICE.

NATHANIEL D. FLY, OF ALICE, TEXAS.

ANT-TRAP.

No. 918,523.　　　　Specification of Letters Patent.　　　　Patented April 20, 1909.

Application filed July 1, 1908. Serial No. 441,335.

*To all whom it may concern:*

Be it known that I, NATHANIEL D. FLY, a citizen of the United States, residing at Alice, in the county of Nueces and State of Texas, have invented certain new and useful Improvements in Ant-Traps, of which the following is a specification.

My invention is an ant trap and is designed for catching burrowing insects and especially is it adapted for catching those species of large ants which infest agricultural districts and are very destructive to vegetation.

This trap may be square or circular, with vertical or slanting walls.

Figure 1:
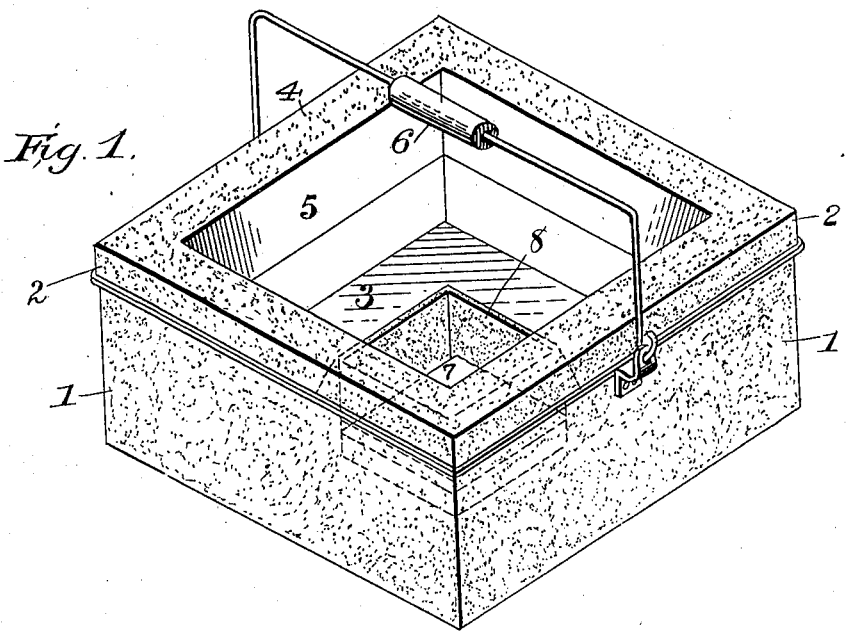
Figure 2:
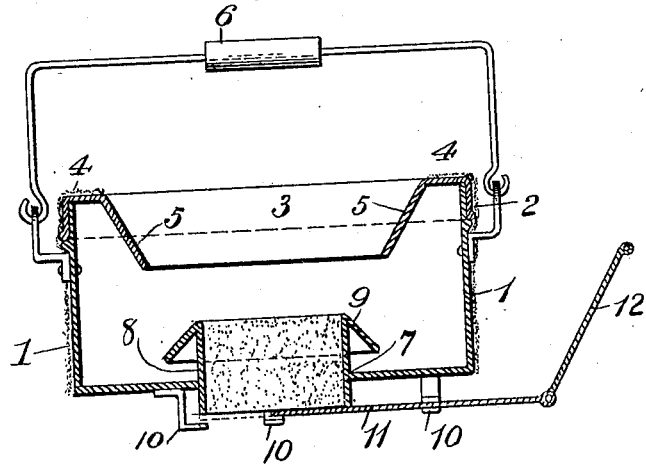
Figure 3:
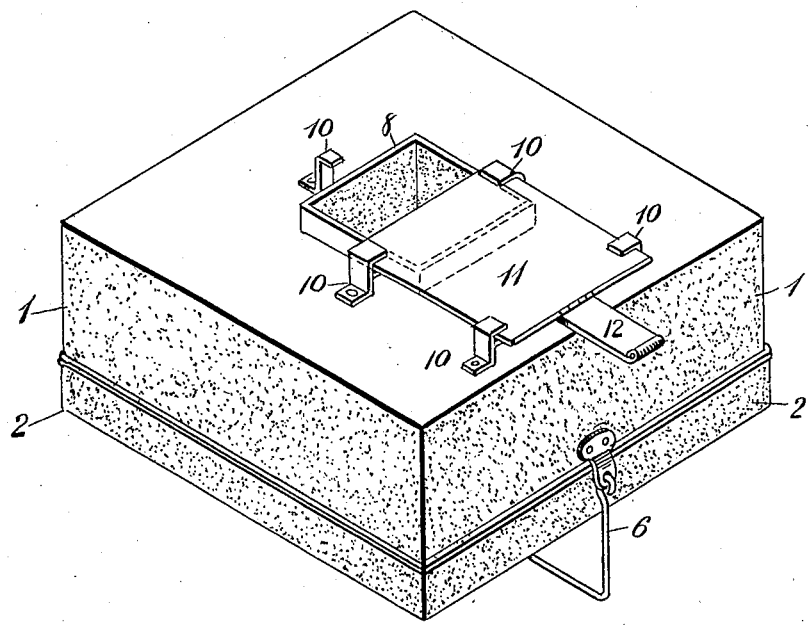
Figure 4:
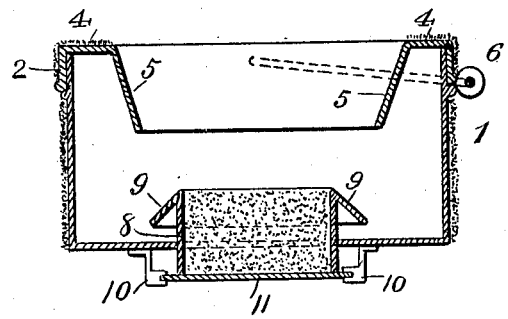

In the accompanying drawings, Figure 1, is a perspective view of my invention. Fig. 2 is a vertical longitudinal sectional view. Fig. 3 is a perspective bottom view. Fig. 4 is a vertical cross sectional view.

My invention is described as follows:—

Referring more particularly to the drawings, the numeral 1, represents the wall of the body; the outside of this wall is roughened by means of being covered with gauze wire, sand, or other material producing that effect. On the upper part of this wall is fitted a lid 2, the vertical and outer face of which is also roughened in a manner similar to the wall of the body.

The center of the lid 2, is cut away forming an opening 3, leaving around said opening a narrow plane 4, which may be roughened or smooth, and secured to the inner edge of said plane is a downwardly and inwardly extending flange 5; the upper face of this flange is perfectly smooth. Hinged to the said wall is a bail 6, for the purpose of conveniently handling said trap. In the bottom of said body is an opening 7, in which is secured an internally roughened, flanged tube 8. This tube may be cylindrical or square. The lower end of said tube extends some little distance below the bottom of the body, and the upper part of said tube extends some distance above the bottom of said body. Extending outwardly and downwardly from the upper end of said tube is a downwardly extending flange 9; the inner face of said tube is roughened by being lined with gauze wire, sand, or other like material producing like effect, while the upper face of said flange is perfectly smooth. Extending from the lower face of the bottom of said body are clips 10, and sliding under said clips is a plate 11, adapted to cover the lower end of said tube, thus entirely closing it from that direction, and hinged to one end of said plate is a hand-hold 12, for the convenience of moving said plate forward and backward. The lid 2 is removable, and the tube 8, may also be removable, for the convenience of cleaning the trap.

In using this trap, it may be baited partly filled with water, or entirely empty.

The class of ants intended to be caught by this trap, is that class that burrow into the earth, throwing up a mound under which they make their nest.

The red ants, which are very troublesome and annoying, leave their nests about sunrise, and go out to prey on young vegetation and return about sundown, while some of the other species of insects that nest in the ground go out after sundown, and return just before sunrise.

When the trap is set, the slide is pulled out and the tube is set immediately over the top of the mound, the lower end being buried partly therein, preventing the ants, or other insects from escaping from under the trap.

The ants, or insects, climb up the inner face of the tube 8, and when they reach the top they slide down over the smooth surface of the flange, drop on the bottom and are trapped.

Should the trapper fail to remove the trap at the proper time, or if any of the ants should return to their nests while the trap is still in place, they will climb up the outside of the body onto the plane 4, and slide down the flange 5, and be trapped.

There is always a considerable number of ants crawling around on the loose dirt at the top of the mound, and just before removing the trap I slip the plate 11, over the bottom opening, and thus secure those ants and keep the others already trapped from, in any way, getting out of said trap until I have time and convenient opportunity to dispose of them.

Although I have specifically described the combination, construction and arrangement of the several parts of my invention I do not confine myself particularly to such specific combination, construction and arrangement, as I may exercise the right to make such changes and modification therein as may clearly fall within the scope of my invention, and which may be resorted to without departing from the spirit, or sacrificing any of my patentable rights therein.

Having described my invention, what I claim as new and desire to secure by Letters Patent, is:—

1. An ant or insect trap, consisting of an externally roughened box, provided with a removable roughened lid, having an opening in its top, leaving around said opening a narrow roughened plane, and extending inwardly and downwardly from said opening a smooth flange; a bottom provided with a central opening; a tube fitting in said opening in said bottom, the lower end of said tube extending below said bottom, and the upper part of said tube extending above said bottom, a smooth flange extending outwardly and downwardly from the upper end of said tube; clips, secured to the bottom of said trap, and a plate sliding under said clips, against the lower end of said tube and adapted to close the bottom end thereof, substantially as shown and described and for the purposes set forth.

2. An ant trap, consisting of a body having the outer face of its wall roughened; a removable lid having the outer face of its wall and top roughened, said top having an opening in its center; a smooth flange extending inwardly and downwardly from the edge of said opening; a bottom provided with a central opening; an internally roughened tube fitting in said opening in said bottom, its lower end extending below and its upper end above said bottom; a smooth flange extending outwardly and downwardly from the upper end of said tube; a plate slidably secured below the bottom of said trap, and adapted to close the lower end of said tube, and a bail hinged to the body of said box, substantially as shown and described and for the purposes set forth.

3. An insect trap, consisting of a body having the outer face of its wall roughened; a removable lid, having the outer face of its wall and top roughened, said top having an opening in its center; a smooth flange, extending inwardly and downwardly from the edge of said opening; a bottom provided with a central opening; an internally roughened tube fitting in said opening in said bottom, its lower end extending below and its upper end above said bottom, and a smooth flange extending outwardly and downwardly from the upper end of said tube, substantially as shown and described and for the purposes set forth.

In testimony whereof I affix my signature, in presence of two witnesses.

NATHANIEL D. FLY.

Witnesses:

BENNO T. GOLDBECK,
JOHN A. BOERUM.